(12) United States Patent
Lu et al.

(10) Patent No.: US 8,374,654 B2
(45) Date of Patent: Feb. 12, 2013

(54) BUFFER PROTECTION STRUCTURE AND MOBILE COMMUNICATION DEVICE HAVING THE SAME STRUCTURE

(75) Inventors: Ding Lu, Shanghai (CN); Shen Zhang, Shanghai (CN); Martin Hsu, Shanghai (CN)

(73) Assignee: Inventec Appliances Corp., Taipei (TW)

( * ) Notice: Subject to any disclaimer, the term of this patent is extended or adjusted under 35 U.S.C. 154(b) by 398 days.

(21) Appl. No.: 12/774,314

(22) Filed: May 5, 2010

(65) Prior Publication Data
US 2010/0291974 A1    Nov. 18, 2010

(30) Foreign Application Priority Data
May 12, 2009    (TW) ................................ 98208154 U

(51) Int. Cl.
*H04Q 7/32*    (2006.01)
(52) U.S. Cl. .................. 455/575.1; 455/566; 455/550.1; 455/575.8; 455/90.3; 455/90.1; 379/435; 379/440; 379/433.01; 379/428.01; 379/451
(58) Field of Classification Search ............... 455/571.1, 455/550.1, 566, 90.1, 90.3, 557, 575, 8; 379/435, 379/440, 433.01, 428.01, 451
See application file for complete search history.

(56) References Cited

U.S. PATENT DOCUMENTS

| 2005/0052582 | A1* | 3/2005 | Mai | 349/12 |
| 2008/0246692 | A1* | 10/2008 | Jeong et al. | 345/1.3 |
| 2009/0263597 | A1* | 10/2009 | Wu et al. | 428/34.1 |
| 2012/0176559 | A1* | 7/2012 | Fujikawa et al. | 349/43 |

FOREIGN PATENT DOCUMENTS
KR    2005041194 A    *    5/2005

* cited by examiner

*Primary Examiner* — Keith Ferguson
(74) *Attorney, Agent, or Firm* — Muncy, Geissler, Olds & Lowe, PLLC

(57) ABSTRACT

A buffer protection structure is provided in a mobile communication device which includes a housing and a flat light-emitting element having plural light tubes. The buffer protection structure is an elastic material and is provided between each inner wall of the housing and outer peripheries of the flat light-emitting element. Outer peripheries of the buffer protection structure are abutted respectively at each inner wall of the housing and inner peripheries of the buffer protection structure are abutted elastically by the outer peripheries of the flat light-emitting element to buffer an external force or impact, such that the light tubes can be prevented from being ruptured.

19 Claims, 6 Drawing Sheets

BUFFER PROTECTION STRUCTURE AND MOBILE COMMUNICATION DEVICE HAVING THE SAME STRUCTURE

CLAIM FOR PRIORITY

This application claims the benefit of Taiwan Patent Application No. 098208154, filed on May 12, 2009, which is hereby incorporated by reference for all purposes as if fully set forth herein.

BACKGROUND OF THE INVENTION

1. Field of Invention

The present invention relates to a mobile communication device, and more particularly to a buffer protection structure which is used to limit displacement of and protect a light tube used as a flat light-emitting element of a display panel in a mobile communication device.

2. Related Art

Throughout the rapid progression and evolution of display technology, conventional CRT (cathode ray tube) displays have been replaced gradually by liquid crystal display because of volume and energy consumption. With advantages of high display quality, low energy consumption and zero radiation, etc., the liquid crystal display can be applied broadly in 3C (Computing, Communication and Consumer) products, such as a mobile phone (or cellular phone), a personal digital assistant, a laptop computer, a digital camcorder, a digital camera, a computer screen and a liquid crystal TV.

The liquid crystal display uses primarily a liquid crystal panel to display. As the liquid crystal panel is a non-spontaneous light-emitting display panel, a backlight module or a flat light-emitting element has to be used to supply a light source which provides sufficient brightness and is uniform distribution, such that the liquid crystal panel can display an image normally. The backlight module, for example, is ordinarily assembled by a cold cathode fluorescent light tube, a light guide plate and a reflector, wherein the backlight module can be divided into a direct-type backlight module (or flat-type backlight module) with a light source being generated from a direct lower side of the display panel or an edge-type backlight module with a light source being generated from a location close to a side of the display panel, according to the location of light source.

Referring to FIG. 1, it shows a drawing of a conventional protection structure for a light tube which serves as a light source of a display panel, wherein a cellular phone M includes a housing M1, a flat light-emitting element M2 and a protection structure M3. The flat light-emitting element M2 may be a backlight module having a cold cathode light tube as a light source or a flat cold cathode light tube, and is provided in the housing M1. The protection structure M3 is a rigid rectangular frame which encloses the flat light-emitting element M2 and is abutted at inner walls of the housing M1 to limit displacement of and protect the flat light-emitting element M2.

However, in such a simple rectangular protection structure, a side surface of a flat light-emitting element in a cellular phone, such as a flat light tube, touches rigidly with the protection structure; whereas, for a flat light-emitting element such as a backlight module, all the backlight modules are made of a fragile plastic material, and as the light tube which is provided in the backlight module is smaller in size, it is relatively fragile; yet the side surface of the light tube still touches rigidly with the protection structure in an indirect way. Nevertheless, a most fragile part in glass of the light tube is the side surface; therefore, the pure rigid protection structure is disadvantageous to absorb lateral impact. Moreover, four corners of the light tube where stress is concentrated most easily collide more easily with the protection structure to rupture the light tube.

SUMMARY OF THE INVENTION

As a result, the object of the present invention is to provide a buffer protection structure which can prevent a light tube used as a flat light-emitting element in a display panel of a cell phone from being damaged due to an external force or cell phone collision and limit displacement of the light tube.

In order to achieve the above objectives, a buffer protection structure is provided in a mobile communication device. The mobile communication device has a housing having a plurality of inner walls and a flat light-emitting element having an outer periphery. The buffer protection structure is characterized in that: the structure being an elastic material and having an outer periphery and an inner periphery, the outer periphery of the structure being leaned on each inner wall of the housing, and the outer periphery of the flat light-emitting element being elastically leaned on the inner periphery of the structure.

In an embodiment of the present invention, the buffer protection structure includes at least two spring leaves which are provided at two opposite portions of the outer periphery of the structure, wherein the outer peripheries of the spring leaves are leaned on the inner walls of the housing, and the inner peripheries of the spring leaves are elastically leaned on the outer periphery of the flat light-emitting element, so as to prevent four corners of the flat light-emitting element from touching the housing.

In an embodiment of the present invention, the buffer protection structure includes four spring leaves which are provided at four portions of the outer periphery of the structure.

In an embodiment of the present invention, the buffer protection structure includes at least two sets of the buffer assemblies at two opposite portions of the outer periphery of the structure, and each set of buffer assembly includes one support element and at least one spring, wherein the support elements are elastically leaned on the outer periphery of the flat light-emitting element, and the springs are disposed between the inner walls of the housing and the support element.

In an embodiment of the present invention, the buffer protection structure includes four sets of buffer assemblies which are provided at four portions of the outer periphery of the structure.

In an embodiment of the present invention, the buffer protection structure further includes a plurality of L-shape reinforce ribs for connecting two adjacent support elements to protect four corners of the flat light-emitting element.

In an embodiment of the present invention, the flat light-emitting element is a backlight module which includes at least one cold cathode light tube in the backlight module.

In an embodiment of the present invention, the flat light-emitting element is a cold cathode flat light tube.

In an embodiment of the present invention, the mobile communication device is a cellular phone or a personal digital assistant.

In order to achieve the above objectives, a mobile communication device including a housing, a flat light-emitting element and a buffer protection structure is provided. The housing has a plurality of inner walls. The flat light-emitting element has an outer periphery and is disposed in the housing. The buffer protection structure is an elastic material and has an outer periphery and an inner periphery, wherein the outer periphery of the structure is leaned on each inner wall of the housing, and the outer periphery of the flat light-emitting element is elastically leaned on the inner periphery of the structure.

In an embodiment of the present invention, the buffer protection structure includes at least two spring leaves which are provided at two opposite portions of the outer periphery of the buffer protection structure, the outer peripheries of the spring leaves are leaned on the inner walls of the housing, and the inner peripheries of the spring leaves are elastically leaned on the outer periphery of the flat light-emitting element, so as to prevent four corners of the flat light-emitting element from touching the housing.

In an embodiment of the present invention, the buffer protection structure includes four spring leaves which are provided at four portions of the periphery of the buffer protection structure.

In an embodiment of the present invention, the buffer protection structure includes at least two sets of buffer assemblies at two opposite portions of the outer periphery of the structure, each set of buffer assembly including one support element and at least one spring, the support elements are elastically leaned on the outer periphery of the flat light-emitting element, and the springs are disposed between the inner walls of the housing and the support element.

In an embodiment of the present invention, the buffer protection structure includes four sets of buffer assemblies which are provided at four portions of the outer periphery of the buffer protection structure.

In an embodiment of the present invention, the buffer protection structure further includes a plurality of L-shape reinforce ribs for connecting two adjacent support elements of the buffer protection structure to protect four corners of the flat light-emitting element.

In an embodiment of the present invention, the flat light-emitting element is a backlight module which includes at least one cold cathode light tube in the backlight module.

In an embodiment of the present invention, the flat light-emitting element is a cold cathode flat light tube.

In an embodiment of the present invention, the mobile communication device is a cellular phone or a personal digital assistant.

Briefly speaking, an advantage of the present invention is to provide a buffer protection structure which prevents from exerting a force to or colliding with a cellular phone that a light tube used as a flat light-emitting element of a display panel is ruptured and limits displacement of the light tube.

To enable a further understanding of the said objectives and the technological methods of the invention herein, the brief description of the drawings below is followed by the detailed description of the preferred embodiments.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

Figure 1:
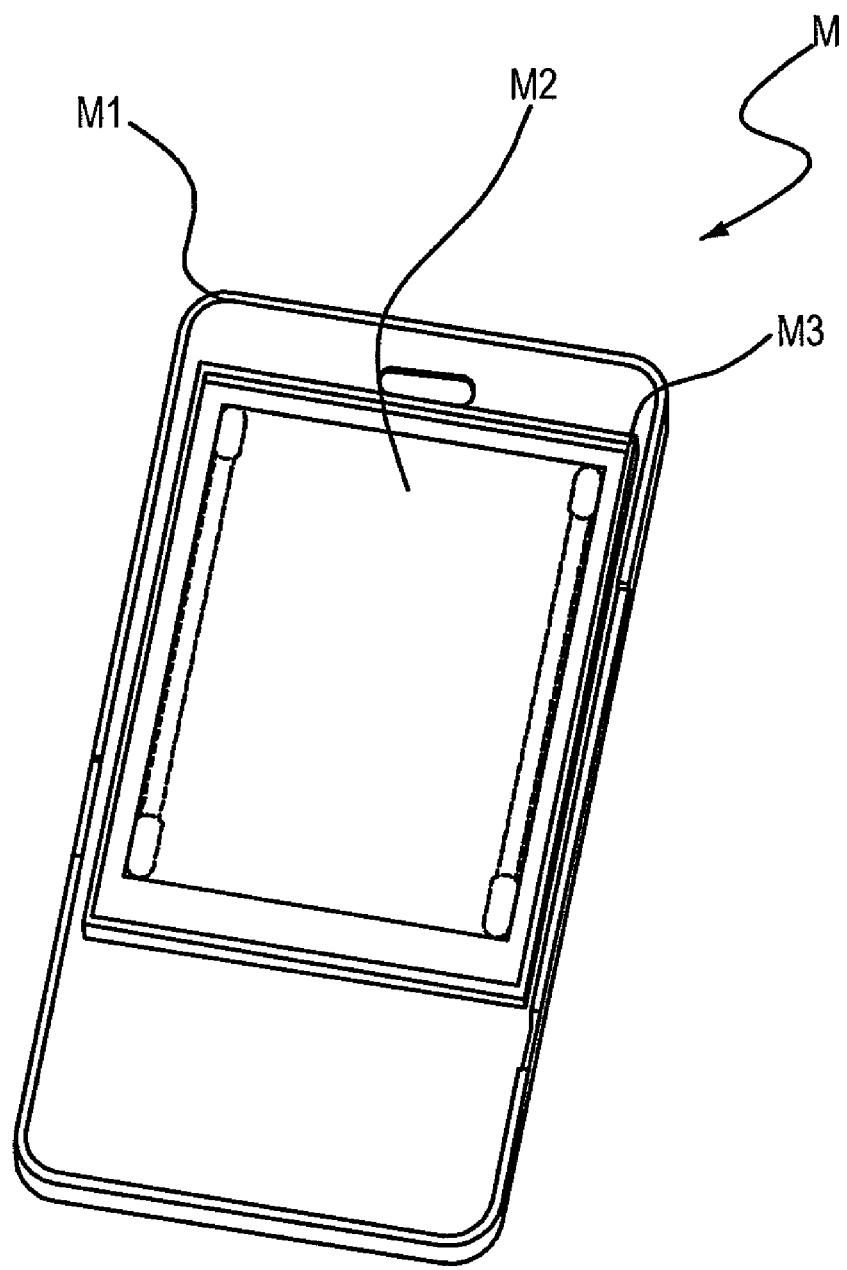
FIG. 1 shows a diagram of a conventional protection structure of a light tube which serves as a light source of a display panel.
Figure 2:
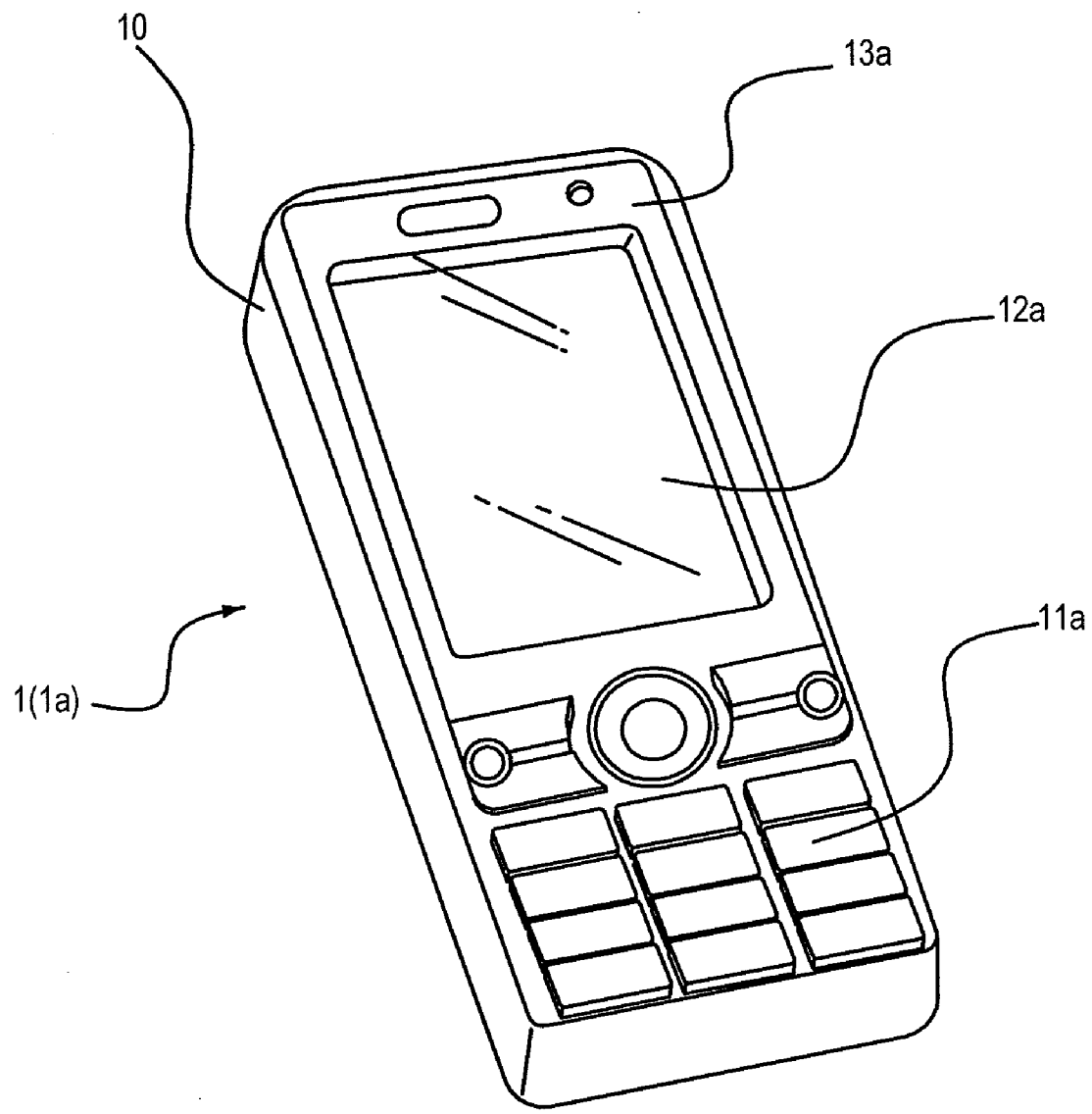
FIG. 2 shows a three-dimensional view of a mobile communication device of the present invention, with a cellular phone as an example.
Figure 3:
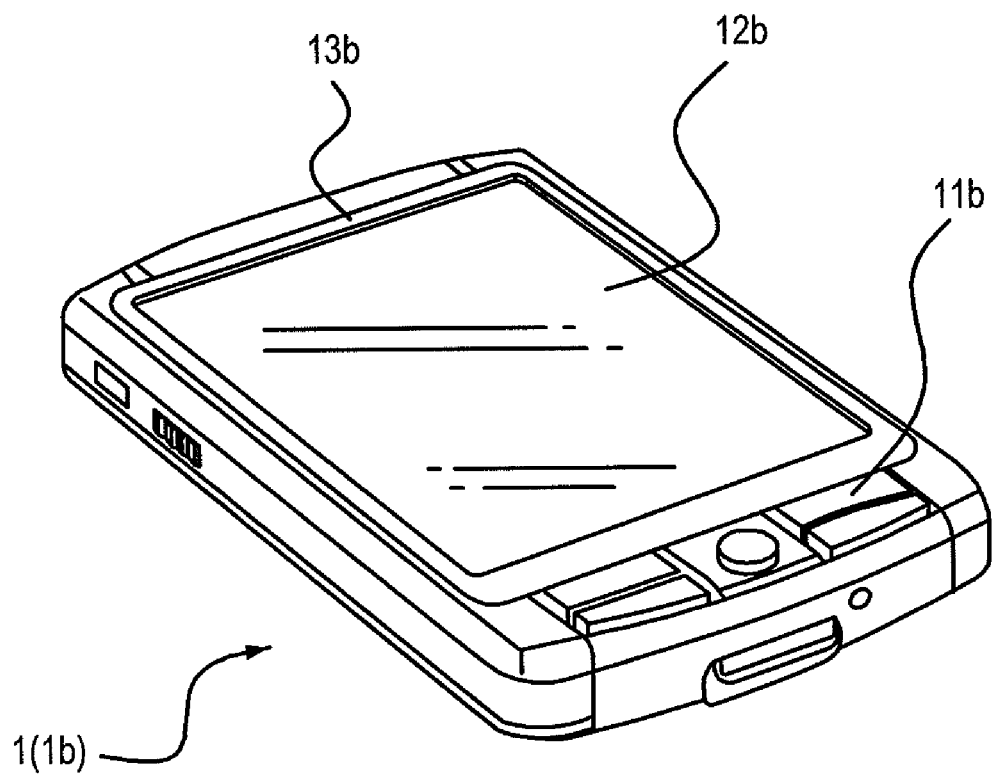
FIG. 3 shows a three-dimensional view of a mobile communication device of the present invention, with a personal digital assistant as an example.

Referring to FIG. 2 and FIG. 3 at a same time, it shows three-dimensional views of a mobile communication device of the present invention, with a cellular phone as an example and with a personal digital assistant as an example, respectively. The mobile communication device 1 of the present invention can be, but not limited to, a cellular phone 1*a* (as shown in FIG. 2) or a personal digital assistant 1*b* (as shown in FIG. 3). To facilitate description hereinafter, the description is made with the cellular phone as an example.

As shown in FIG. 2, the cellular phone 1*a* comprises a housing 10 which has a plurality of inner walls. The cellular phone 1*a* is further provided with a push-button area 11*a*, a display area 12*a* and a sounding area 13*a*; whereas, an interior of the housing 10 is provided with a flat light-emitting element 3 which has an outer periphery (as shown in FIG. 4).

On the other hand, when the mobile communication device 1 is the personal digital assistant 1*b*, the structure is about the same as that of the cellular phone 1*a* (as shown in FIG. 3), having the push-button area 11*b*, the display area 12*b* and the sounding area 13*b*. However, the mobile communication device 1 can be only provided with the display area 12*b* and the sounding area 13*b* as well, wherein the display area 12*b* is a touch panel (not shown in the drawings) that data is entered through touching, without installing the push-button area 11*a* of the cellular phone 1*a*.

Figure 4:
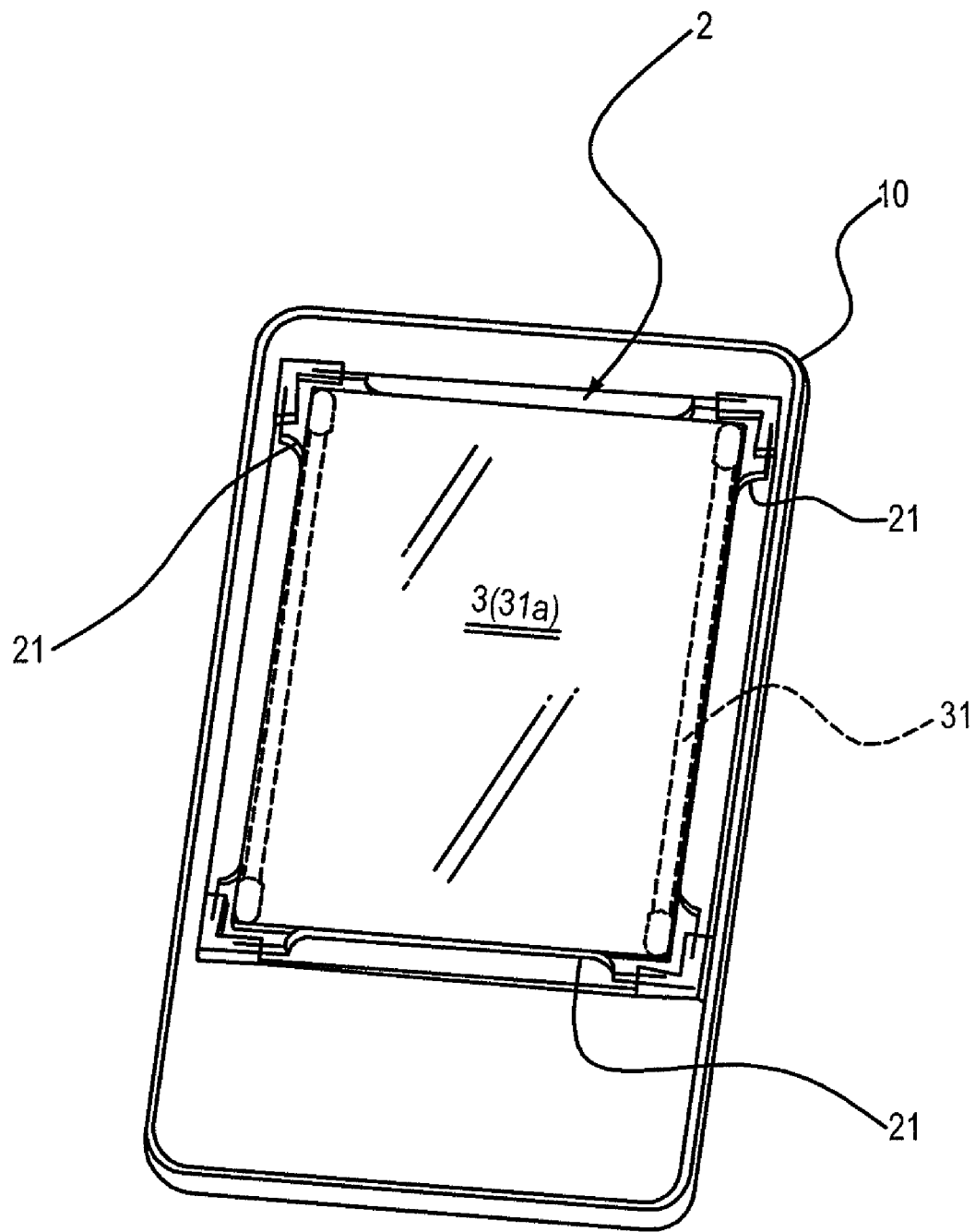
FIG. 4 shows a partial assembly diagram of an embodiment of the present invention.
Figure 5:
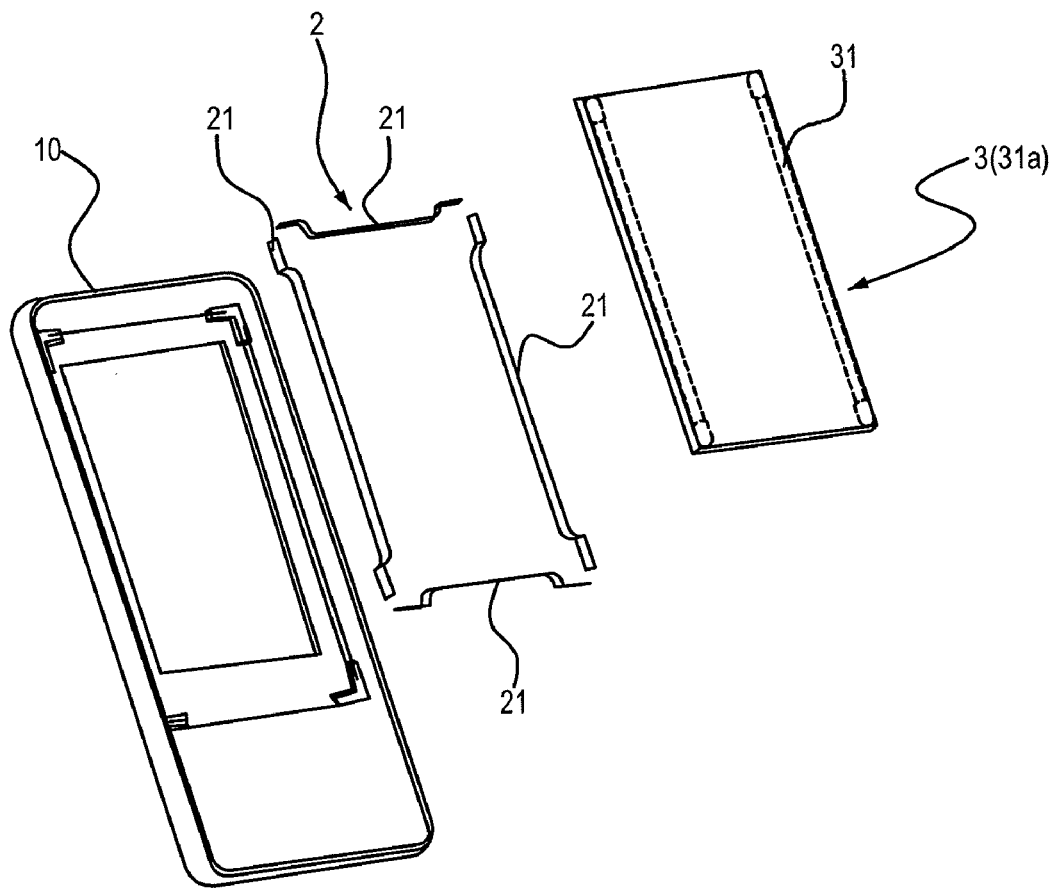
FIG. 5 shows a partial exploded view of an embodiment of the present invention.

Referring to FIG. 4 and FIG. 5, it shows a partial assembly diagram and a partial exploded view of an embodiment of the present invention. A buffer protection structure 2 of the present embodiment is provided in the aforementioned mobile communication device 1. Hereinafter the description is made with the cellular phone 1*a* as an example, and the cellular phone 1*a* is provided with a housing 10 and a flat light-emitting element 3.

The flat light-emitting element 3 is a backlight module, in which at least one cold cathode light tube 31*a* is included; whereas, the flat light-emitting element 3 itself can be a cold cathode flat light tube 31.

The buffer protection structure 2 is an elastic material and has an outer periphery and an inner periphery. The outer periphery of the structure is leaned on each inner wall of the housing 10, and the outer periphery of the flat light-emitting element is elastically leaned on the inner periphery of the structure. The buffer protection structure 2 includes at least two spring leaves 21 which are provided at two opposite portions of the outer periphery of the structure. In addition, the outer peripheries of the spring leaves 21 are leaned on the inner walls of the housing 10, and the inner peripheries of the spring leaves 21 are elastically leaned on the outer periphery of the flat light-emitting element 3, so as to prevent four corners of the flat light-emitting element 3 from touching the housing 10.

Accordingly, when the housing 10 of the cellular phone 1*a* is exerted by an external force or is impacted, impact energy can be absorbed by elastic deformation of each spring leaf 21. On the other hand, when the external force or impact disappears, each spring leaf 21 can assure that the flat light-emitting element 3 is restored and as four corners of the flat light-emitting element 3 do not touch with the housing 10, the external force is unable to act directly on the four corners of the flat light-emitting element 3 where stress is concentrated most easily, thereby effectively protecting the light tube 31 or 31a of the flat light-emitting element 3 in the cellular phone 1a.

In the present embodiment, the buffer protection structure 2 includes at least two spring leaves 21 to restrict displacement of the flat light-emitting element 3. However, in other embodiment, the buffer protection structure 2 includes four spring leaves 21 which are provided at four portions of the outer periphery of the structure 2.

Figure 6:
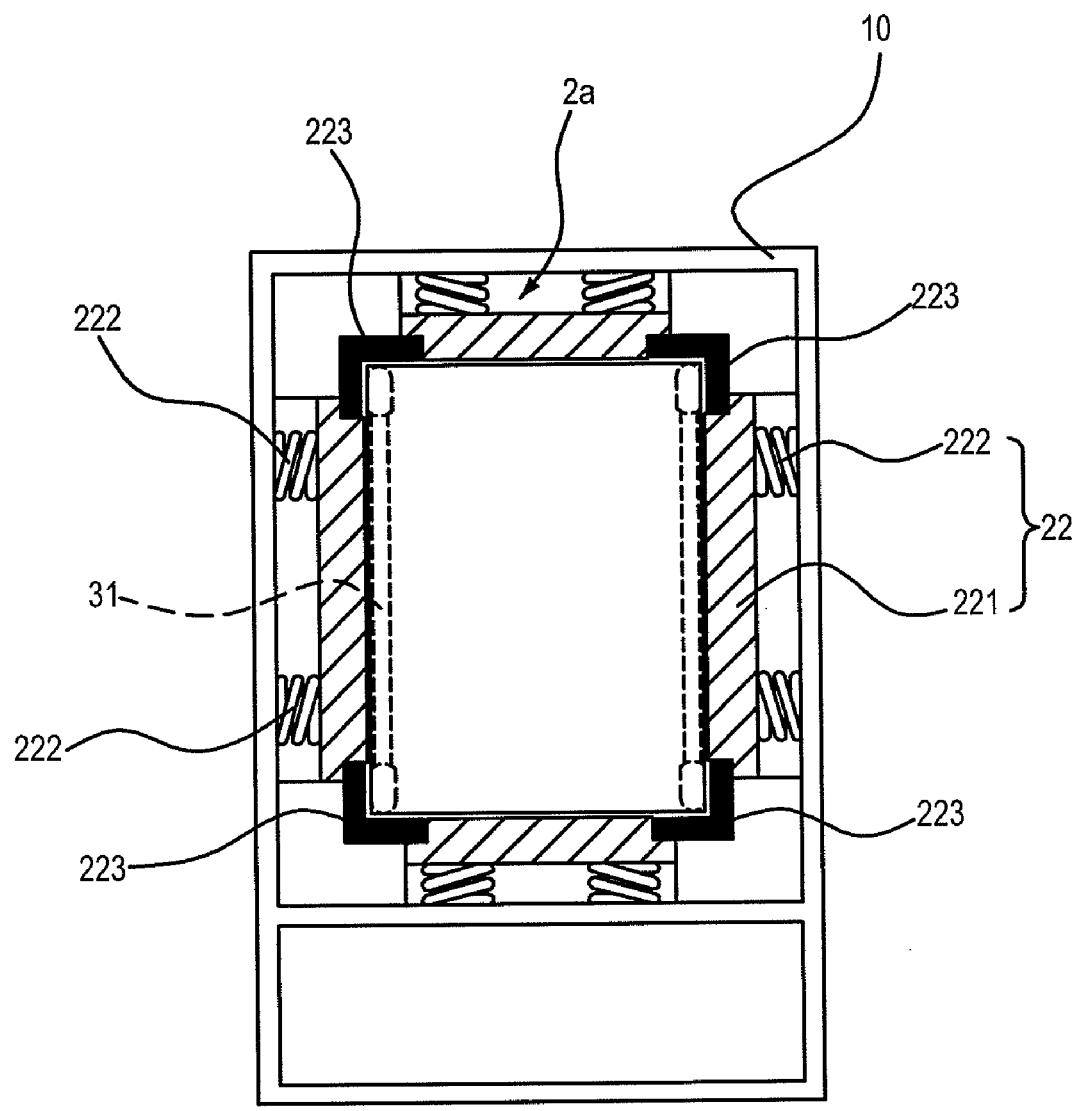
FIG. 6 shows a partial structural diagram of another embodiment of the present invention.

Referring to FIG. 6, it shows a partial structural diagram of another embodiment of the present invention. The buffer protection structure 2a of the present embodiment includes at least two sets of buffer assemblies 22, each set of the buffer assembly 22 includes a support element 221 and at least one spring 222, but can also include a single spring 222 or more than two springs 222, without limitation.

The at least two sets of buffer assemblies 22 are provided at two opposite portions of the outer periphery of the structure 2a, and the support elements 221 are elastically leaned on the outer periphery of the flat light-emitting element 3, and the springs 222 are disposed between the inner walls of the housing 10 and the support element 221. In the present embodiment, the buffer protection structure 2a uses at least two sets of buffer assemblies 22 to restrict displacement of the flat light-emitting element 3.

Yet, in other embodiment, the buffer protection structure 2a includes four sets of buffer assemblies which are provided at four portions of the outer periphery of the structure, thereby restricting displacement of the flat light-emitting element 3. Moreover, the buffer protection structure 2a further includes a plurality of L-shape reinforce ribs 223. Each L-shape reinforce rib 223 is connected with two adjacent support elements 221 of every two buffer assemblies 22, so as to protect four corners of the flat light-emitting element 3. The springs 222 of each buffer assembly 22 are provided between the inner walls of the housing 10 and the support elements 221, and inner peripheries of the support elements 221 are elastically leaned on the outer periphery of the flat light-emitting element 3, thereby restricting displacement of the flat light-emitting element 3.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A buffer protection structure being provided in a mobile communication device which is provided with a housing having a plurality of inner walls and a flat light-emitting element having an outer periphery, characterized in that:
the structure being an elastic material and having an outer periphery and an inner periphery, the outer periphery of the structure being leaned on each inner wall of the housing, and the outer periphery of the flat light-emitting element being elastically leaned on the inner periphery of the structure;
wherein the buffer protection structure comprises at least two spring leaves which are provided at two opposite portions of the outer periphery of the structure, wherein outer peripheries of the spring leaves are leaned on the inner walls of the housing, and inner peripheries of the spring leaves are elastically leaned on the outer periphery of the flat light-emitting element, so as to prevent four corners of the flat light-emitting element from touching the housing.

2. The buffer protection structure according to claim 1, wherein the structure comprises four spring leaves which are provided at four portions of the outer periphery of the structure.

3. The buffer protection structure according to claim 1, comprising at least two sets of buffer assemblies at two opposite portions of the outer periphery of the structure, each set of buffer assembly including one support element and at least one spring, wherein the support elements are elastically leaned on the outer periphery of the flat light-emitting element, and the springs are disposed between the inner walls of the housing and the support element.

4. The buffer protection structure according to claim 3, wherein the structure comprises four sets of buffer assemblies which are provided at four portions of the outer periphery of the structure.

5. The buffer protection structure according to claim 4, further comprising a plurality of L-shape reinforce ribs for connecting two adjacent support elements to protect four corners of the flat light-emitting element.

6. The buffer protection structure according to claim 1, wherein the flat light-emitting element is a backlight module which comprises at least one cold cathode light tube in the backlight module.

7. The buffer protection structure according to claim 1, wherein the flat light-emitting element is a cold cathode flat light tube.

8. The buffer protection structure according to claim 1, wherein the mobile communication device is a cellular phone or a personal digital assistant.

9. A mobile communication device, comprising:
a housing having a plurality of inner walls;
a flat light-emitting element having an outer periphery and disposed in the housing; and
a buffer protection structure being an elastic material and having an outer periphery and an inner periphery, wherein the outer periphery of the structure is leaned on each inner wall of the housing, and the outer periphery of the flat light-emitting element is elastically leaned on the inner periphery of the structure;
wherein the buffer protection structure comprises at least two spring leaves which are provided at two opposite portions of the outer periphery of the buffer protection structure, outer peripheries of the spring leaves are leaned on the inner walls of the housing, and inner peripheries of the spring leaves are elastically leaned on the outer periphery of the flat light-emitting element, so as to prevent four corners of the flat light-emitting element from touching the housing.

10. The mobile communication device according to claim 9, wherein the buffer protection structure includes four spring leaves which are provided at four portions of the periphery of the buffer protection structure.

11. The mobile communication device according to claim 9, wherein the flat light-emitting element is a backlight module which comprises at least one cold cathode light tube in the backlight module.

12. The mobile communication device according to claim 9, wherein the flat light-emitting element is a cold cathode flat light tube.

13. The mobile communication device according to claim 9, wherein the mobile communication device is a cellular phone or a personal digital assistant.

14. A mobile communication device, comprising:
a housing having a plurality of inner walls;
a flat light-emitting element having an outer periphery and disposed in the housing; and
a buffer protection structure being an elastic material and having an outer periphery and an inner periphery, wherein the outer periphery of the structure is leaned on each inner wall of the housing, and the outer periphery of the flat light-emitting element is elastically leaned on the inner periphery of the structure;
wherein the buffer protection structure comprises at least two sets of buffer assemblies at two opposite portions of the outer periphery of the structure, each set of buffer assembly including one support element and at least one spring, the support elements are elastically leaned on the outer periphery of the flat light-emitting element, and the springs are disposed between the inner walls of the housing and the support element.

15. The mobile communication device according to claim 14, wherein the buffer protection structure comprises four sets of buffer assemblies which are provided at four portions of the outer periphery of the buffer protection structure.

16. The mobile communication device according to claim 15, wherein the buffer protection structure further comprises a plurality of L-shape reinforce ribs for connecting two adjacent support elements of the buffer protection structure to protect four corners of the flat light-emitting element.

17. The mobile communication device according to claim 14, wherein the flat light-emitting element is a backlight module which comprises at least one cold cathode light tube in the backlight module.

18. The mobile communication device according to claim 14, wherein the flat light-emitting element is a cold cathode flat light tube.

19. The mobile communication device according to claim 14, wherein the mobile communication device is a cellular phone or a personal digital assistant.

* * * * *